(12) United States Patent
Webb

(10) Patent No.: US 10,464,822 B1
(45) Date of Patent: Nov. 5, 2019

(54) SOLAR POWERED WATER PURIFICATION KIOSK

(71) Applicant: Ronald Michael Webb, Elk Mound, WI (US)

(72) Inventor: Ronald Michael Webb, Elk Mound, WI (US)

(73) Assignee: U-Fuel, Inc., Las Vegas, NV (US)

(*) Notice: Subject to any disclaimer, the term of this patent is extended or adjusted under 35 U.S.C. 154(b) by 0 days.

(21) Appl. No.: 16/218,768

(22) Filed: Dec. 13, 2018

Related U.S. Application Data

(60) Provisional application No. 62/598,259, filed on Dec. 13, 2017.

(51) Int. Cl.
| | |
|---|---|
| E03B 1/04 | (2006.01) |
| C02F 1/00 | (2006.01) |
| G07F 13/06 | (2006.01) |
| G07F 13/00 | (2006.01) |
| F24T 50/00 | (2018.01) |
| E03B 3/12 | (2006.01) |

(52) U.S. Cl.
CPC .............. *C02F 1/006* (2013.01); *C02F 1/008* (2013.01); *E03B 1/04* (2013.01); *E03B 3/12* (2013.01); *F24T 50/00* (2018.05); *G07F 13/00* (2013.01); *G07F 13/065* (2013.01); *C02F 2201/009* (2013.01)

(58) Field of Classification Search
CPC .... C02F 1/006; C02F 1/008; C02F 2201/009; E03B 1/02; E03B 1/04; E03B 3/08; E03B 3/12; F24T 10/20; F24T 50/00; G07F 13/00

USPC ........ 210/747.1, 747.7, 806, 170.01, 170.07, 210/184, 186, 257.1, 257.2, 258, 259; 222/146.1, 189.06, 189.08; 165/45
See application file for complete search history.

(56) References Cited

U.S. PATENT DOCUMENTS

| | | | | |
|---|---|---|---|---|
| 4,161,446 A | * | 7/1979 | Coillet ................. | B01D 61/025 210/186 |
| 4,448,237 A | * | 5/1984 | Riley ....................... | F24T 10/20 165/45 |
| 4,969,991 A | * | 11/1990 | Valadez .................... | C02F 9/00 210/258 |
| 5,183,100 A | * | 2/1993 | Harrell, Jr. .............. | F24T 10/17 165/45 |
| 5,597,487 A | * | 1/1997 | Vogel ...................... | B01D 61/08 210/259 |
| 6,436,283 B1 | * | 8/2002 | Duke ........................ | E03B 3/02 210/259 |

(Continued)

*Primary Examiner* — Christopher Upton
(74) *Attorney, Agent, or Firm* — Anthony J. Bourget

(57) ABSTRACT

A solar powered water purification kiosk configured for placement above a water well and having a base having walls defining an interior, the base positioned above the well having a pump, a canopy positioned above the base and having at least one solar panel configured to generate electricity to be provided to the pump, a radiator positioned within the interior and configured to receive water pumped from the pump, a filter configured to receive water from the radiator, and a dispenser configured to receive water from the filter. The solar panels recharge batteries configured to power the pump and the radiators are configured to provide geothermal heating/cooling via the water pumped from the well to control the temperature within the kiosk.

21 Claims, 14 Drawing Sheets

(56) References Cited

U.S. PATENT DOCUMENTS

| | | | | |
|---|---|---|---|---|
| 2007/0119759 | A1* | 5/2007 | Duplessis | C02F 1/008 |
| | | | | 210/259 |
| 2008/0073058 | A1* | 3/2008 | Ueyama | F24T 10/20 |
| | | | | 165/45 |
| 2012/0205004 | A1* | 8/2012 | Webb | B60S 5/02 |
| | | | | 141/98 |
| 2013/0299123 | A1* | 11/2013 | Matula | F24T 10/20 |
| | | | | 165/45 |
| 2014/0091041 | A1* | 4/2014 | Nielsen | C02F 9/00 |
| | | | | 210/257.1 |
| 2014/0202565 | A1* | 7/2014 | Bittner | C02F 1/006 |
| | | | | 210/153 |
| 2017/0096356 | A1* | 4/2017 | Al-Jlil | E03B 3/08 |

* cited by examiner

SOLAR POWERED WATER PURIFICATION KIOSK

BACKGROUND OF THE INVENTION

1. Field of the Invention

This invention relates to the field of dispensing systems, and particularly to systems and facilities configured to dispense water from a well or other supply.

2. Background Information

Facilities and systems are known for dispensing liquids such as fuels or other liquids. Such systems may be portable and typically include a tank which is periodically refilled via supply trucks for instance. One such system includes a battery powered fuel station as shown in U.S. Patent Application Serial No. 2012/0205004 by Webb. The Webb fuel station includes solar panels and rechargeable batteries for storing electricity to operate the station.

While the foregoing may have beneficial features, there is room for improvement.

SUMMARY OF THE INVENTION

In one aspect the invention pertains to a solar powered water purification and dispensing kiosk. The kiosk is configured to draw water from a well, distribute the water to heat and/or cool the kiosk, purify the water, and return the water to the well or dispense the water for use. A dispensing system dispenses the water upon payment by a user, for instance.

In a further aspect the invention comprises a kiosk including a pump to pump water from a well and configured to supply the pumped water to heating/cooling elements within the kiosk to heat/cool the kiosk and including a water filtration system to purify the water, a storage tank configured to hold the purified water, a dispenser configured to dispense the water, and a return line configured to return purified water to the well. In one aspect the pump is configured to run continuously such that when the tank is full the purified water automatically returns to the well.

In a further aspect the invention includes a method of dispensing water, including pumping water from a well located beneath a kiosk and to a tank within the kiosk, passing the water from the tank to a radiator within the kiosk, passing the water from the radiator to a filter within the kiosk to provide filtered water, storing the filtered water in a tank, and dispensing the filtered water from the tank via a dispenser to a position external the kiosk. In further aspects the method includes passing the water from the radiator back to the well. A set of radiators may be positioned within the kiosk for temperature control.

In a further aspect the present invention includes a method of manufacturing a water dispensing kiosk of the type note above by positioning the kiosk above a well and connecting a water line from the well to the tank.

The above partial summary of the present invention is not intended to describe each illustrated embodiment, aspect, or every implementation of the present invention. The figures and detailed description and claims that follow more particularly exemplify these and other embodiments and further aspects of the invention.

Figure 1:
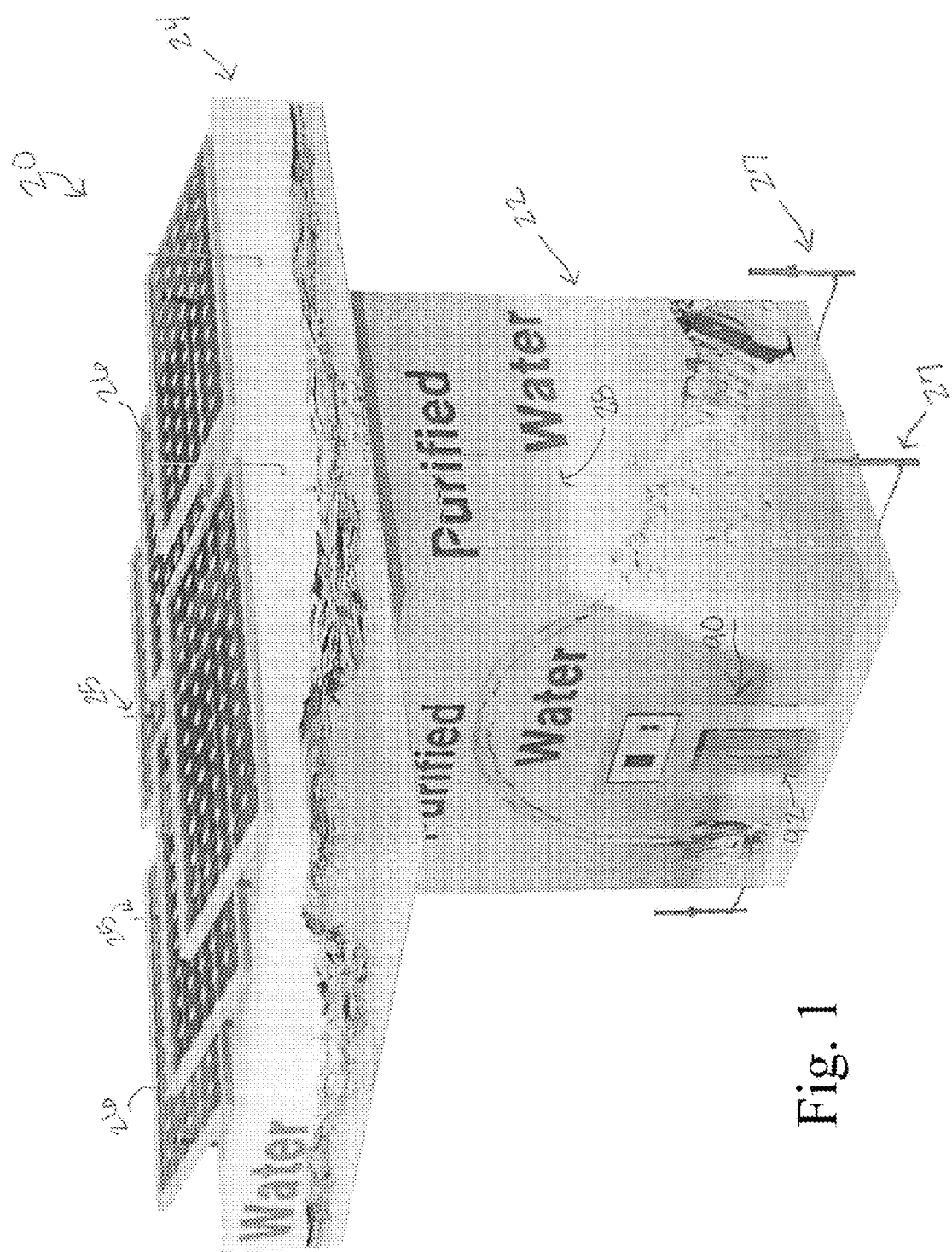
FIG. 1 is a perspective view of a kiosk made in accordance with one aspect of the present invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring to FIGS. 1-18, aspects of a solar powered water purification kiosk, system and methods are shown. FIG. 1 depicts kiosk 20 which includes a base 22 and canopy 24. In one aspect canopy 24 extends beyond the footprint of base 22 and contains a solar panel or array of solar panels 26. Base 22 is configured to house further operational components of kiosk 20. An access door 28 leads to an interior 29 of base 22 and allows a person to enter the interior 29 for construction, repair, assembly, and maintenance or otherwise.

Figure 2:
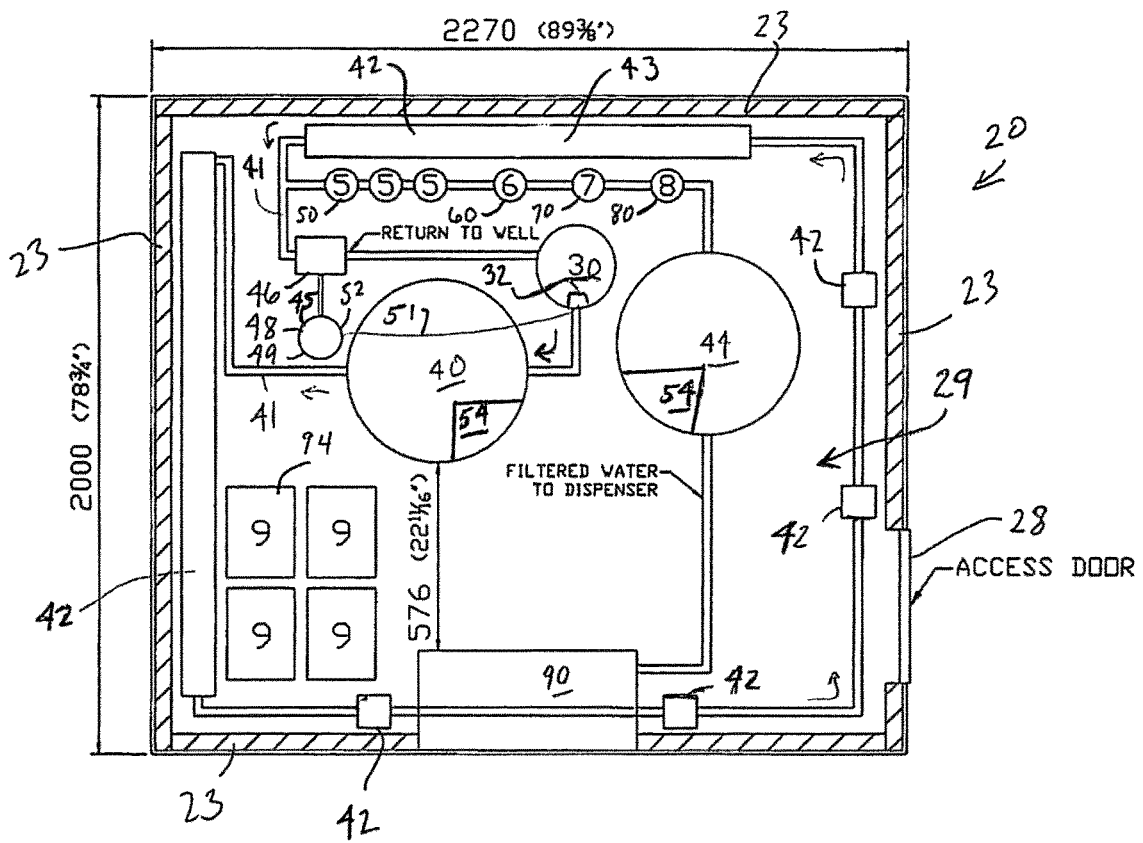
FIG. 2 is a plan view of an interior of the kiosk of FIG. 1.

FIG. 2 is a plan view of the interior 29 of base 22. Walls 23 enclose interior 29. A well 30 is located within kiosk 20. More particularly, a well 30 is used or drilled so that water may be removed from the well to be supplied to kiosk 20. The water from the well is used to both heat/cool kiosk 20 and to be dispensed (before or after filtering) at a dispenser 90. Dispenser 90 is configured with a payment system in one aspect. Kiosk 20 is built or assembled or positioned upon well 30. In further aspects more than one well 30 may be utilized with kiosk 20. A pump 32 is typically used with or within well 30 to pump water from the well 30 to a retaining tank 40. In one aspect retaining tank 40 is also pressurized or comprises a pressure tank configured to receive and retain water under pressure. In one instance tank 40 is a 40 gallon tank. A line or conduit 41 leads from tank 40 to a radiator 42 or series of radiators 42. In one aspect radiators are stainless steel. The water from pump 30 has temperature corresponding to a ground temperature which maintains a relatively stable temperature level. The water is utilized for geothermal heating and cooling control of kiosk 20 as may be appreciated. Water circulates through line 41 to successive radiators 42 and lines 41 located throughout or about the perimeter of base 22 and/or at various radiator locations in order to provide the interior 29 with a temperature consistent with the ground temperature. In further aspects a heat exchanger is used. The line 41 and radiators 42 are configured to allow water to circulate back to well 30. In one aspect the circulation is in a closed loop arrangement.

A radiator 42 includes thin-walled tubes and/or metal fins and/or a series or coil of pipes through which water passes for heating and/or cooling within kiosk 20. The radiators 42 are designed to transfer heat via the circulating well water, making an otherwise cool environment warmer, or a warm environment cooler. In one aspect a series of radiators 42 are positioned about the perimeter of the kiosk 20 at ground level. A terminal radiator 43 (FIG. 2) is a radiator 42 most down-stream from the pump 32 and closest to the filter 50. Water from the terminal radiator 43 flows directly to the filter 50 or circulates back to the well 30. In one aspect, terminal radiator 43 is positioned along a perimeter of a wall of kiosk 20 and fed water via another radiator 42 positioned along a perimeter of a different wall of the kiosk 20. In further aspects the terminal radiator 43 is fed via a series of radiators 42 where each radiator is positioned along a different wall of the kiosk 20. The radiators 42 may be elongated, as with terminal radiator 43, or shortened as with some of the radiators 42 depicted in FIG. 2.

In one aspect, water from radiator 42 flows to filter 50 or a series of filters 50. An example of a filter is a carbon filter 50 configured to cleans the water of particulate matter. The water continues flow to a micro filtration filter 60 or system 60 for further purification, and then to ultra-filtration filter 70 or filtration system 70 for yet further purification, and still further to UV treatment apparatus 80 or UV treatment system 80. The purification through filters and systems 50, 60, 70 and 80 undertake removal of particulate matter as small as 0.02 micron including removal of bacteria and heavy metals, and accomplish killing of viruses in the water. In one aspect a bactericide, such as a small amount of chlorine, is introduced into the purified water. The purified water is passed to a retaining tank 44. Water at tank 44 is pressurized and is fed to a dispenser 90. At dispenser 90 a user may place a container in the bottle receptacle 92 for dispensing of the water. In one aspect, a credit card reader or other credit device or payment mechanism is provided for dispensing the water. A user selects the desired amount to dispense and removes the container when it is full. Vessels of different volumes may be used and filled as desired. 20 liter and smaller bottle sized may be provided, for instance. A water meter conforming to weights and measures is included with dispenser 90.

In further reference to FIG. 2, a battery 94 or series of batteries 94 are configured to receive electrical charge via solar panels 26. Battery 94 is configured to be recharged by panels 26. Kiosk 20 is designed to operate on or off the electrical grid. Battery 94 is configured to provide electricity to pump 32 and other components of kiosk and associated systems as provided herein. A valve 46, which in one aspect is a solenoid valve, is configured to open/close line 41 in response to an electrical signal to allow water to pass valve 46 to be returned to well 30 or to pass to filters 50 (or to flow partially to both well 30 and filter 50). For instance, if valve 46 is open, water will pass to well 30. If valve 46 is closed, water will pass to filters 50, 60, 70 80. In one aspect valve 46 is configured to respond to a timer 48. In further aspects, a timer 48, which may include or be a part of a processor, chip, computer or controller 49 is also provided to handle control of kiosk 20 and associated systems and methods of operation. Controller 49 may comprise a computing device 300 noted below. In one aspect controller 49 communicates by sending a signal (wired or wirelessly) to pump 30 to control operation of the pump (on/off, speed, etc.). In one aspect, controller 49 is configured, via a program (including via computer software) to receive instructions wirelessly. A communications module or system 52 or communications connection 320 and antenna are provided to send and receive signals, including sending and receiving wireless signals to and from controller 49. Controller 49 is configured to control the timer 48, pump 30 and valve 49 and communication systems 52 (wired or wireless). A thermostat 45 is provided to measure or sense the temperature of interior 29 and send a signal to controller 49. Controller 49 is configured to automatically open or close solenoid 46 and to start or stop pump 30 based on a set or present temperature value. Controller 49 may be connected wirelessly to solenoid 46 and/or pump 30 or may be connected via a wired connection such as at wire 51.

Kiosk 20 is configured with access door 28 to allow for maintenance of filters 50, 60, 70, 80 and all components within interior 29. A maintenance schedule may be configured and programmed into controller 49 to send communication signals to maintenance crew as needed or as programmed. The maintenance crew will refresh filters as needed. In one aspect, kiosk 20 includes a flush line (to back-flush the various filters 50, 60, 70, 80) (See FIG. 18). The flush line in one aspect is configured to return the flushed water to well 30 (or in other cases the flushed water may be disposed of by dispensing externally from kiosk 20). Use of flush line accommodates for refreshing of filters without replacement of filter medium. In some instances a filter medium will need to be replaced, in which case a maintenance schedule is established or a signal is sent from kiosk to a control center for an alert to undertake maintenance. Where flush lines are utilized, additional valves such as solenoid valves and control communications are configured to selectively control the operation.

In one aspect kiosk 20 is equipped with a communication system or connection 320, including an antennae to provide wireless communication to a remote operator of kiosk 20. Communication system or connection 320 includes an interface to communicate with controller 49.

Figure 15:
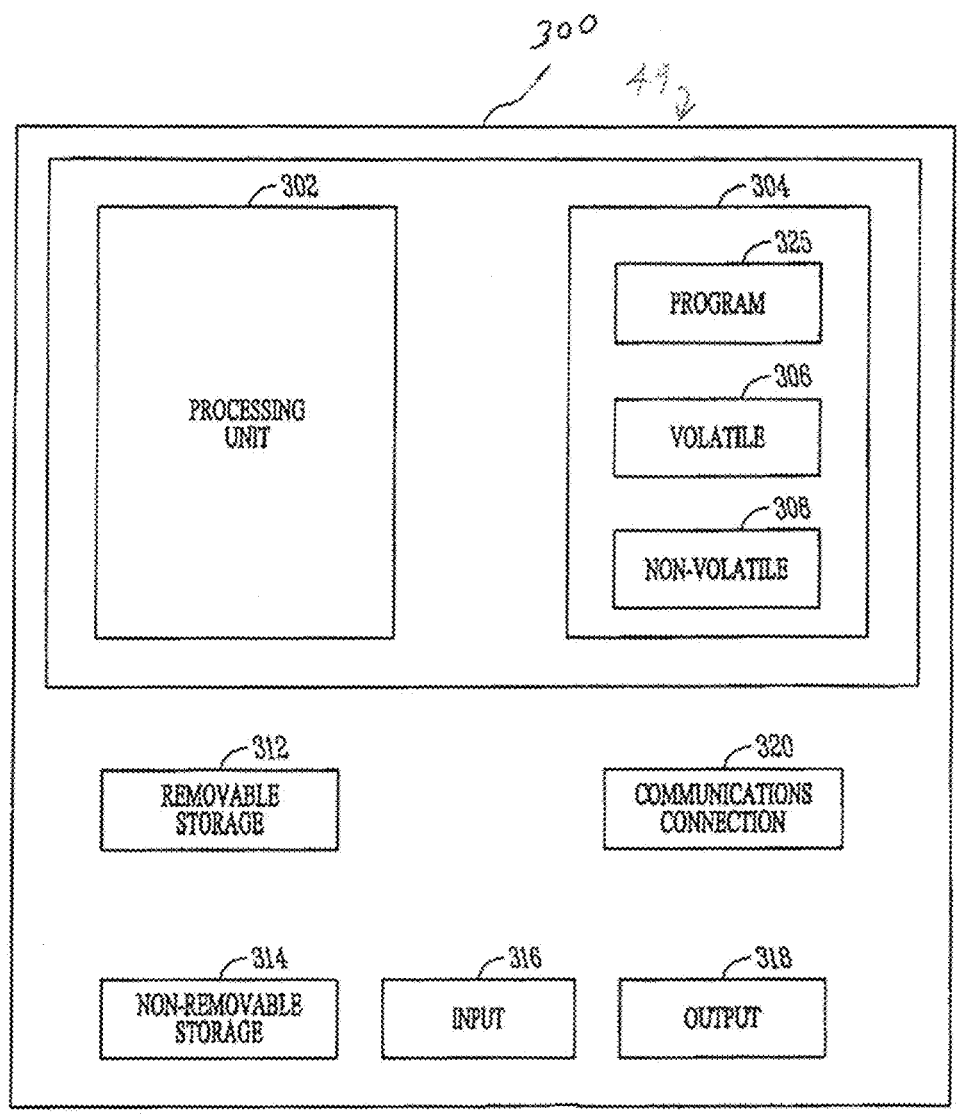
FIG. 15 is a block diagram in accordance with a further aspect of the invention.
Figure 16:
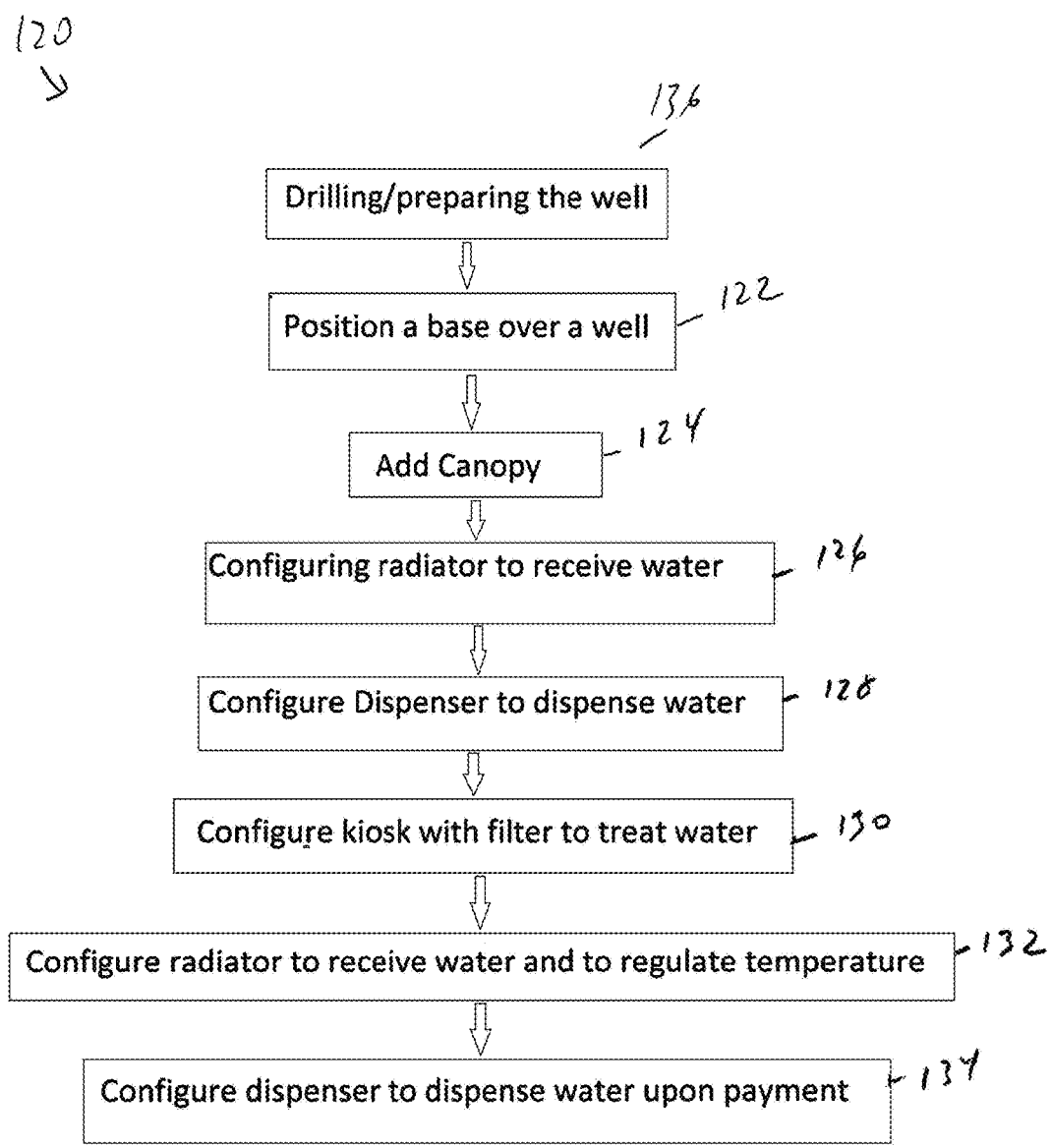
FIG. 16 is a flow chart in accordance with a further method aspect of the invention.
Figure 17:
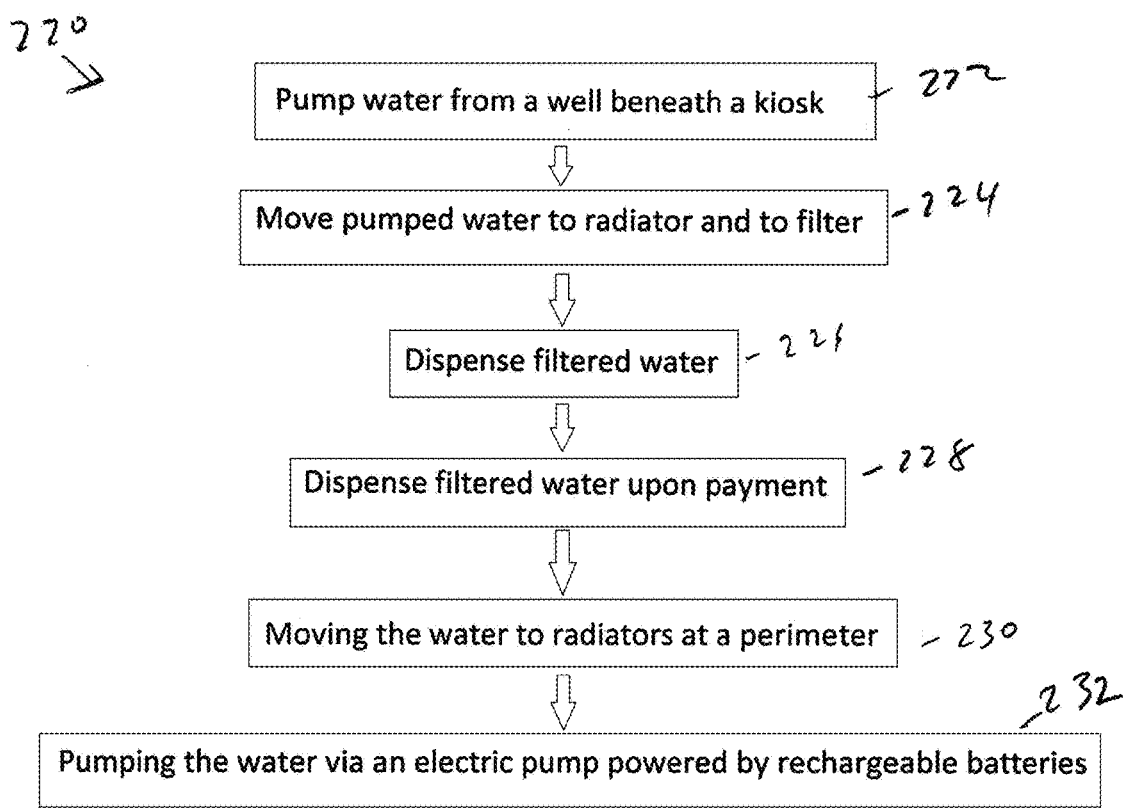
FIG. 17 is a flow chart in accordance with a further method aspect of the invention.

FIG. 15 is a block diagram of a computer system or computing device 300 in accordance with one aspect of the invention and to implement methods as described. In one aspect kiosk 20 includes the computer system or device 300 which may also include a processor and a memory and a computer program. All components of device 300 described herein need not be used in various aspects. One example computing device in the form of a computer 300 includes a processing unit 302, memory 304, removable storage 312, and non-removable storage 314. Memory 304 may include volatile memory 306 and non-volatile memory 308. Computer 300 may include—or have access to a computing environment that includes—a variety of computer-readable media, such as volatile memory 306 and non-volatile memory 308, removable storage 312 and non-removable storage 314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 300 may include or have access to a computing environment that includes input 316, output 318, and a communication connection 320. The computer may operate in a networked environment using a communication connection to connect to one or more remote computers. The remote computer may include a personal computer (PC), server, router, network PC, a peer device or other common network node, or the like, including computer 300. The communication connection may include a Local Area Network (LAN), a Wide Area Network (WAN) or other networks. In one aspect, multiple computer systems 300 are utilized in a distributed network to implement multiple components in a transaction-based environment. An object-oriented, service-oriented, or other architecture may be used to implement such functions and communicate between the multiple systems and components. Device 300 in aspects interacts wirelessly (or via wired connection) through communications connection 320. Users may also interact with connection 320, and/or dispenser 90 is also configured to interact with connection 320.

Computer-readable instructions stored on a computer-readable medium are executable by the processing unit 302 of the computer 300. A hard drive, CD-ROM, and RAM are some examples of articles including a computer-readable medium. A computer program 325 may be capable of performing one or more of the methods illustrated and described herein, or portions thereof. While a single computer program 325 is shown, multiple computer programs 325 may be included in various aspects.

As used herein, the term "computer program" is intended to encompass an executable program that exists permanently or temporarily on any computer-readable recordable medium that causes the computer or computer processor to execute the program.

In operation, electricity captured from panels 26 and stored in batteries 94 is used to power pump 32 to pump water from well 30 which is located beneath kiosk 20. Water from well 30 flows to tank 40 where it is retained and pressurized. The pumping operation is electrically controlled via controller 49 or device 300 which is programmed or scheduled for timed operation or operation based on criteria. Water flows from tank 40 (in the direction noted with the arrow in FIG. 2) to radiators 42 to provide a geothermal heating/cooling action. Water circulates about the perimeter of base 22 and is selectively supplied or fed to filters 50, 60, 70, 80, or returned to well 30. When supplied to the filters, the water is treated and/or purified and flows to retaining tank 44. Water flows from tank 44 via dispenser 90. Accordingly, the present kiosk system is configured to utilize the ground water for both geothermal heating/cooling and dispensing as potable water or surgical grade water. The energy is replenished via solar panels 26. Further aspects of the operations are provided throughout the remainder of the disclosure.

In one aspect kiosk 20 is configured such that pump 30 runs continuously (or for a prolonged period of time). Continuous running of pump 30 (or running pump 30 for a prolonged period of time) results in an efficient flow of water for purification and places less stress on pump 30 and less overall energy consumption. For instance, a continually running pump in some instances experiences greater lifespan compared to a pump that is run infrequently; and in some instances having a slowly and prolonged running pump accommodates an efficient energy usage compared to intermittent start/stopping. Backup pumps may also be provided in association with well 30.

In further aspects sensors 54 located in tank 44 and tank 40 (and at other components of kiosk 20) are configured to communicate with controller 49. Sensors 54 sense a water level and/or water pressure and other characteristics (flow rate, temperature, water quality, etc) within respective tanks 40, 44 or components. Controller 49 is configured or programmed to respond to the various circumstances and conditions sensed by sensors 54.

In one aspect base 22 includes four walls 23 which enclose interior 29. A wall 23 comprises a panel which in one aspect is a heat insulating panel. Panel 23 in further aspects includes reinforcing layers and in yet further aspects includes a Faraday barrier metal layer or metal mesh material. Panels 23 are grounded or connected to a grounding stake 27 or grounding system. Canopy 24 is also grounded to a grounding stake 27 or grounding system. Canopy 24 also includes a lightning rod or rods 25 to minimize impact of lightning strikes. A communications antennae projects upward from canopy 24 as desired.

A solar panel 26 or array of solar panels 26 are configured to supply energy to rechargeable batteries 94. Panels 26 in one aspect are oriented at angles to optimize capture of solar radiation.

Figure 3:
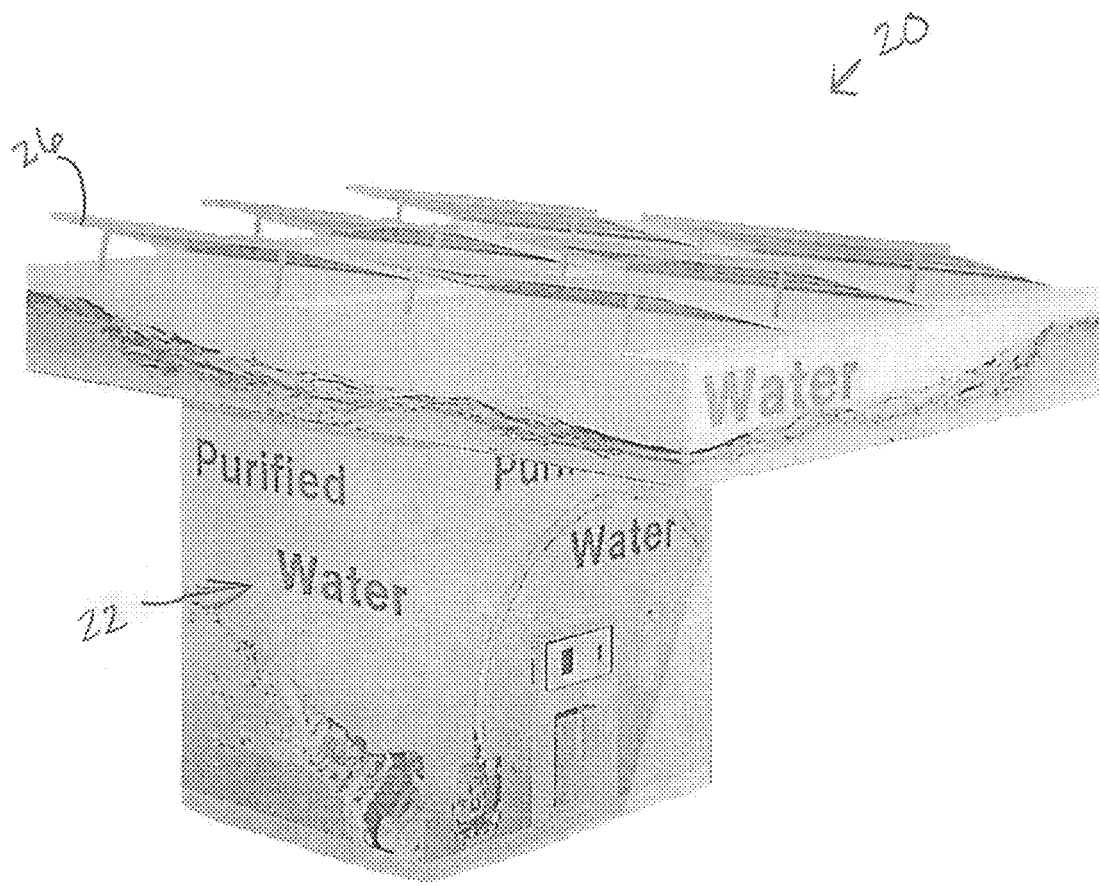
FIG. 3 is a reverse perspective view of the kiosk of FIG. 1.
Figures 4, 5:
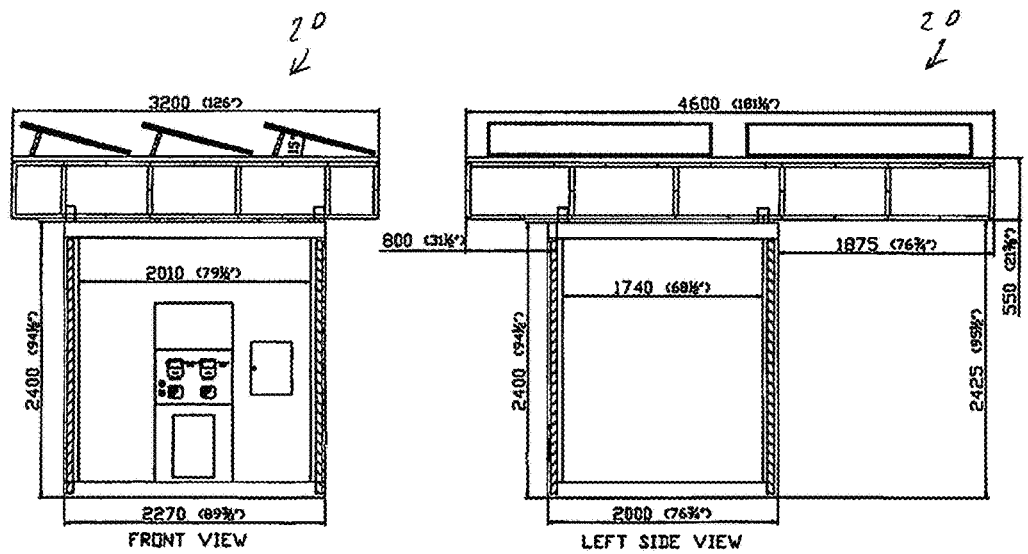
FIG. 4 is a front view of the kiosk of FIG. 1.
FIG. 5 is a left side view of the kiosk of FIG. 1.
Figures 6, 7:
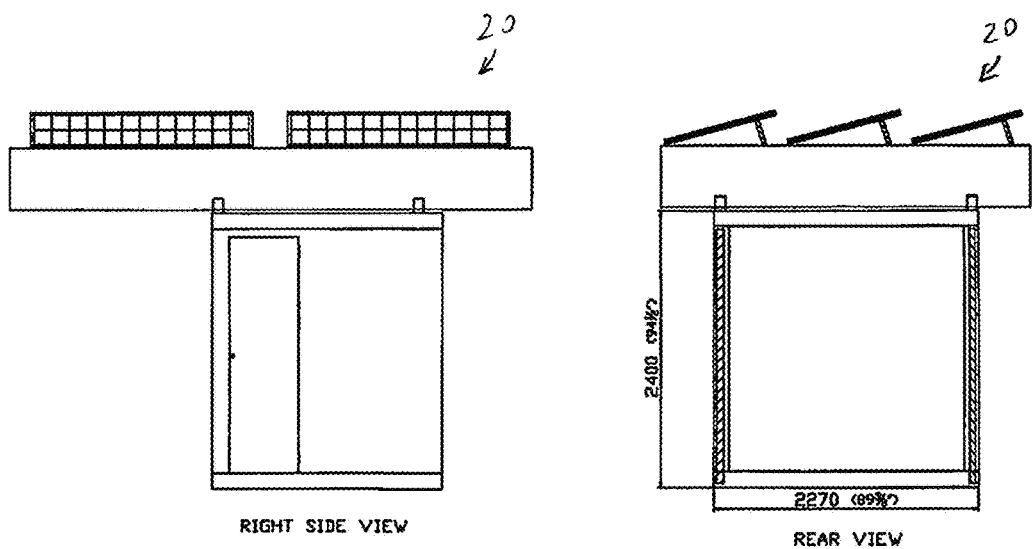
FIG. 6 is a right side view of the kiosk of FIG. 1.
FIG. 7 is a rear view of the kiosk of FIG. 1.
Figure 9:
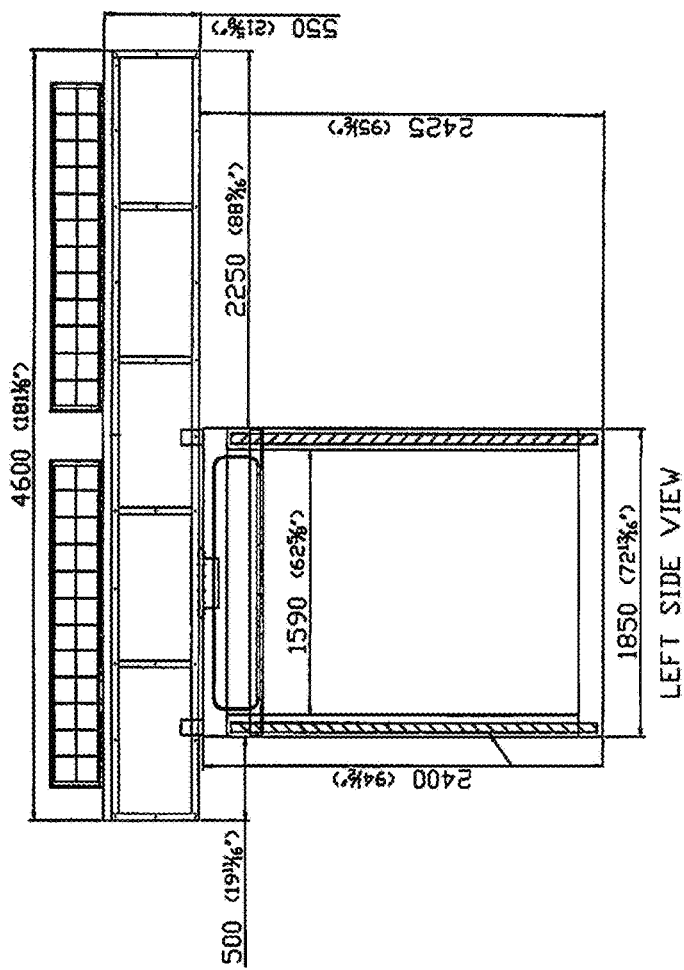
FIG. 9 is a side view the kiosk shown in FIG. 8.
Figure 8:
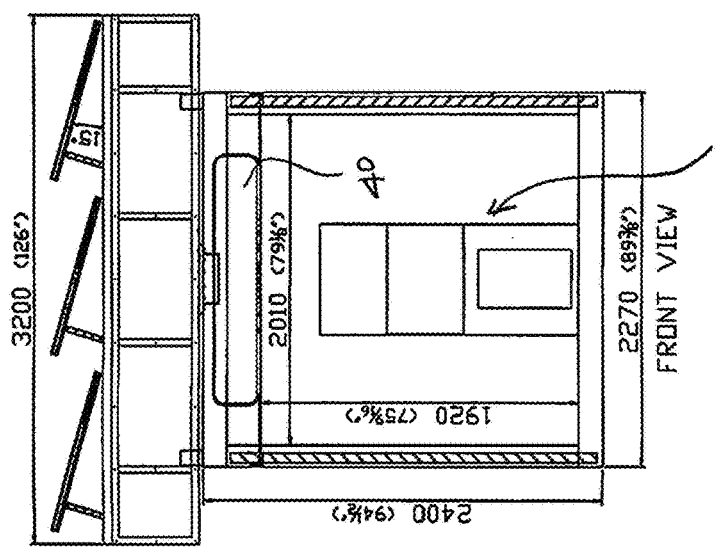
FIG. 8 is a front view of a kiosk made in accordance with a further aspect of the invention.
Figure 10:
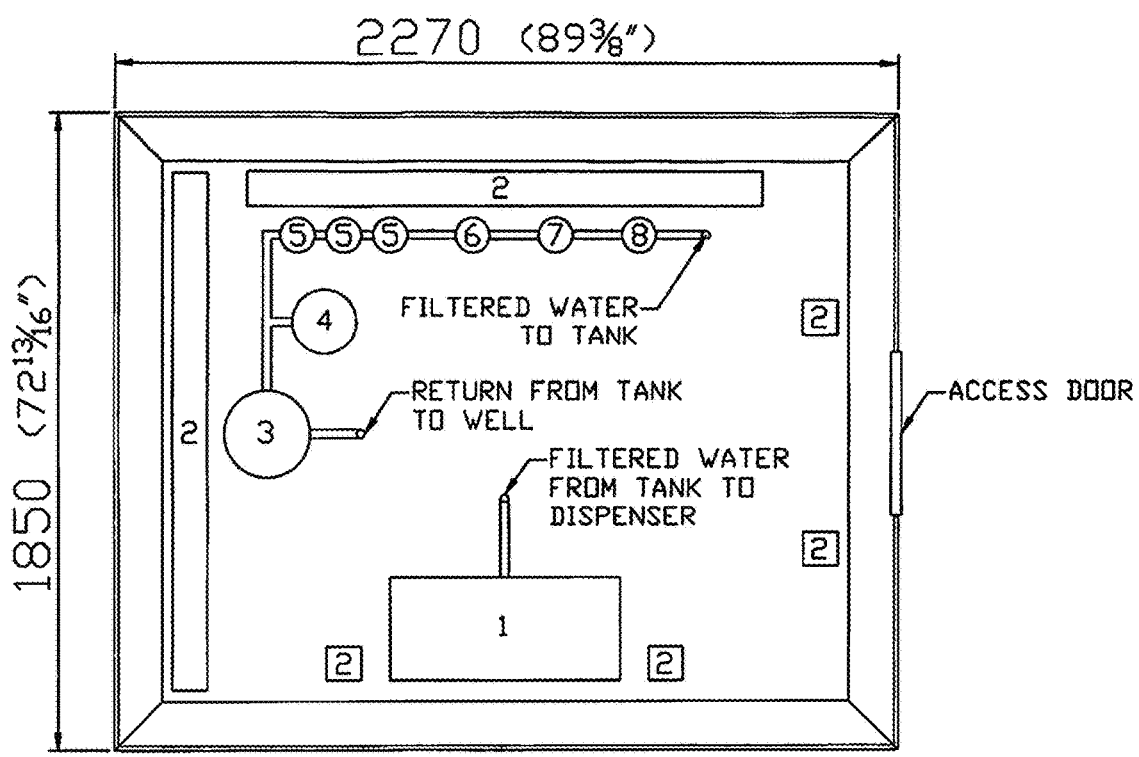
FIG. 10 is a plan view of an interior of the kiosk of FIG. 8.

FIG. 3 shows a perspective view of kiosk 20. Panels 26 are configured to be angled to an appropriate incident angle with respect to the sun to capture solar radiation. Canopy 24 extends beyond the footprint of base 22 to provide greater area for use of panels 26. Canopy 24 extends over an area adjacent dispenser 90 to provide overhead protection. Lights or lighting (LEDs) is supplied at canopy 24 or exterior walls 23 in one aspect to illuminate the area adjacent the dispenser 90. Additional external lighting may be used to draw attention or for advertisement of kiosk 20. Internal lighting is also provided within interior 29 for desired illumination. Lights are powered via rechargeable batteries 94 originating from solar power from panels 26. Base 22 and canopy 24 are configured to allow a user to stand underneath canopy while filling a vessel with water from dispenser 90. FIG. 4 shows a front view of kiosk 20 and dispenser 90. FIG. 5, FIG. 6 and FIG. 7 show various views of kiosk 20.

In operation of one system aspect of the invention, controller 49 is configured to run pump 34 continuously for a prolonged period of time (or instance 6 hours) so that water is pumped from well 30 and distributed throughout kiosk 20 to maintain a desired internal temperature (with or without being filtered), and in some aspects to also assure a desired volume of purified water is present in retaining tank 44. When water is dispensed from dispenser 90, controller 49 is configured to activate pump 32 to replenish the purified water. In one aspect a sensor is configured with tank 44 and in communication with controller 49 to determine if and when further pumping action should occur to replenish tank 44. In further aspects controller 49 is configured to accommodate for time of use or special event timing in order to accommodate efficient supply of water within tank 44. In other aspects, a plurality of kiosks 20 are networked such that data is received from the network of kiosks in order to ascertain trends in the information ("big data") to determine optional operation of the system of kiosks or any particular kiosk 20. In one aspect kiosk 20 is configured to work completely independent from any other kiosk 20.

Figure 11:
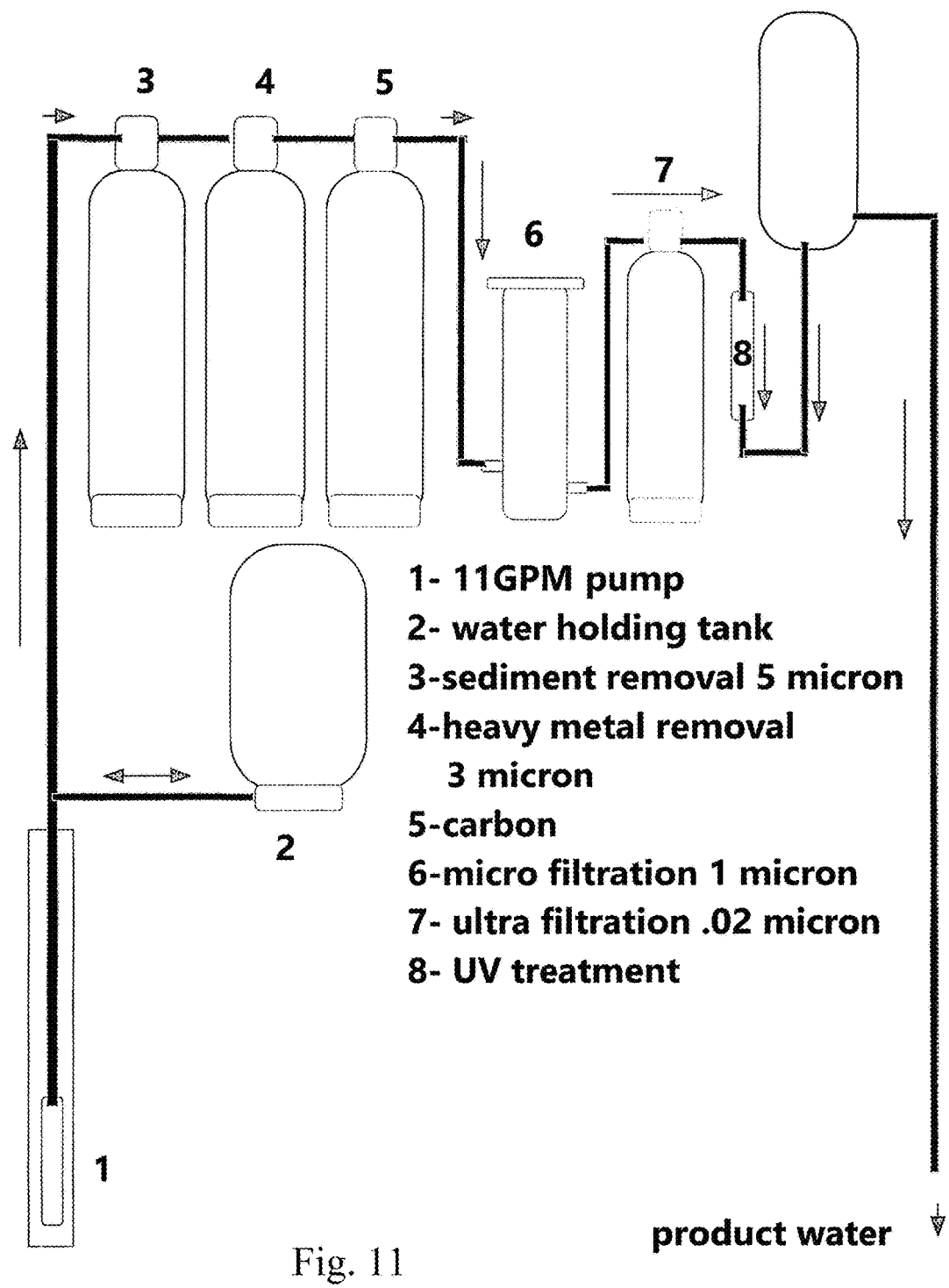
FIG. 11 is diagram depicting a flow of water about the kiosk shown in FIG. 8.
Figure 12:
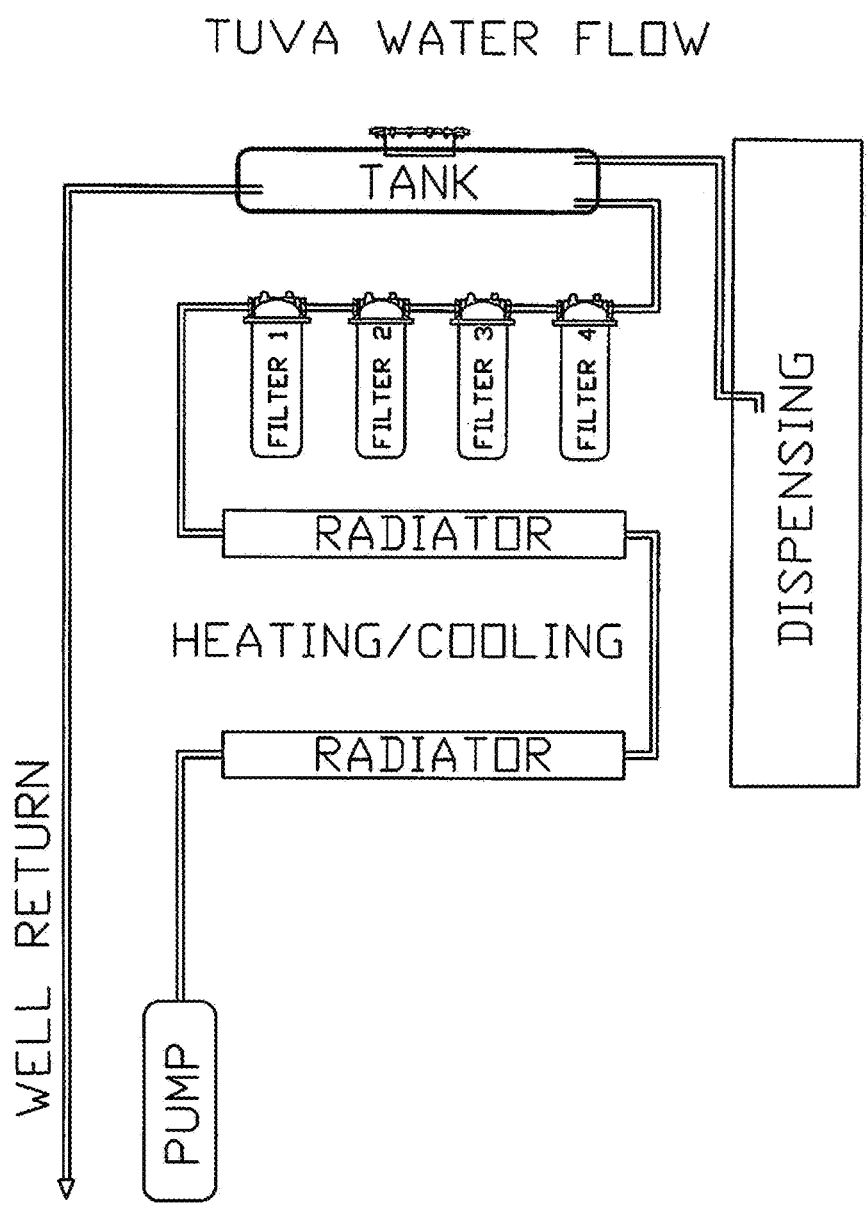
FIG. 12 is a diagram depicting a flow of water about the kiosk shown in FIG. 8.

A kiosk 20 in accordance with a further aspect of the invention is shown in FIGS. 8-12. In this aspect a tank 40 is positioned at an upper or top portion of base 22. Water is pumped from well 30 to tank 40 where the upper location of tank 40 allows for use of gravity assist in dispensing the water which is filtered via filter systems 50, 60, 70, 80. Water from well 30 is circulated through radiators 42. Circulated water which exits filter system is dispensed via dispenser 90. FIG. 11 depicts one aspect of a flow action of water through filters and filtering system. FIG. 12 demonstrates an alternative geothermal, filtering and dispensing arrangement where the pumped water is used for geothermal control of the interior 29 of kiosk 20 and subsequently flow through filters and then to a holding tank 40 where the water is either dispensed for potable purposes or returned to the well 30 for recirculation (and re-filtering).

Figure 13:
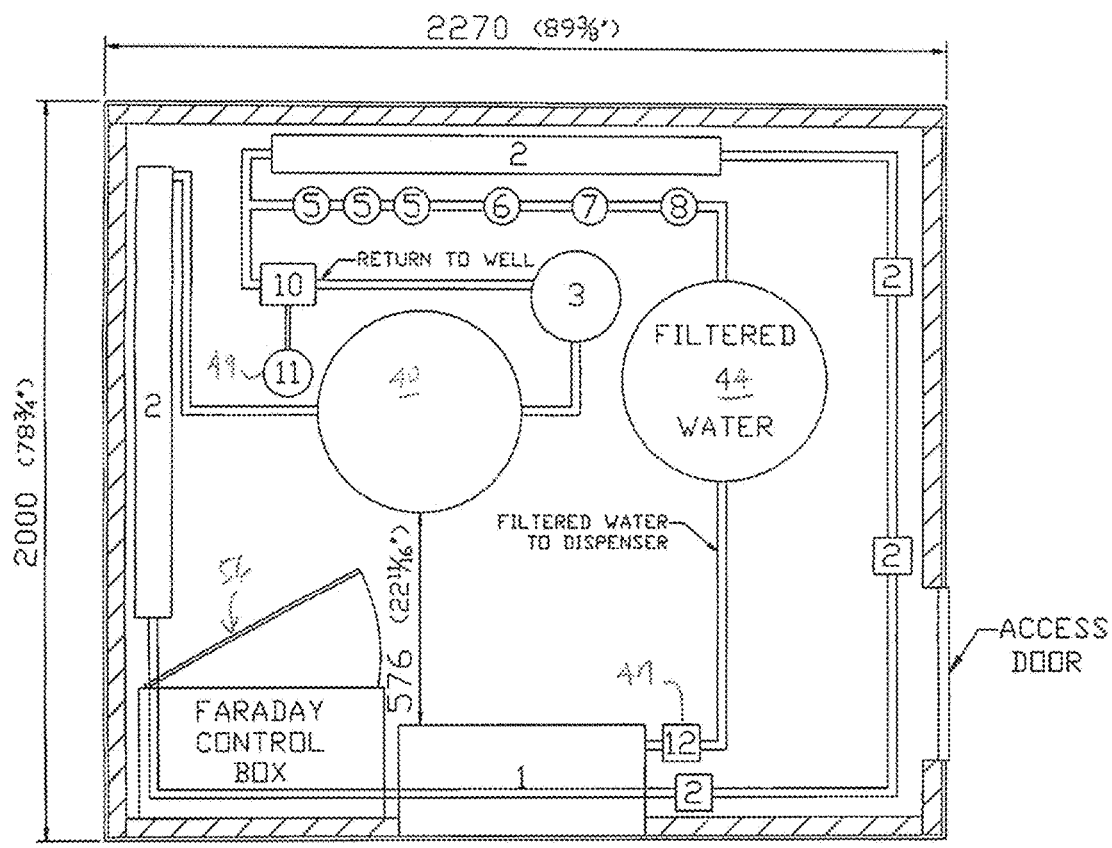
FIG. 13 is a plan view of an interior of a kiosk in accordance with a further aspect of the invention.

Referring to FIG. 13, in further aspects, the valve 46, timer 48 and/or associated controller 48, communications system 52 and batteries 94 are contained in a Faraday box or cage 56 within kiosk 20 in order to better prevent malfunction due to errant electrical waves, including due to an electromechanical or electromagnetic wave pulse or pulses. In further aspects, additional electrical devices are contained within cage or box 56 for protection of such devices. While controller 49 shown in FIG. 13 is not positioned within box 56, it may be appreciated that box 56 may be positioned to house controller 49 (or controller 49 may alternatively be repositioned within box 56, along with other electrical components). A valve or dispenser solenoid 47 in one aspect is positioned along dispenser line 41 to control operation of dispenser 90. Valve 47 is in communication with controller 49. Valve 47 may also be positioned within a faraday box 56.

Figure 14:
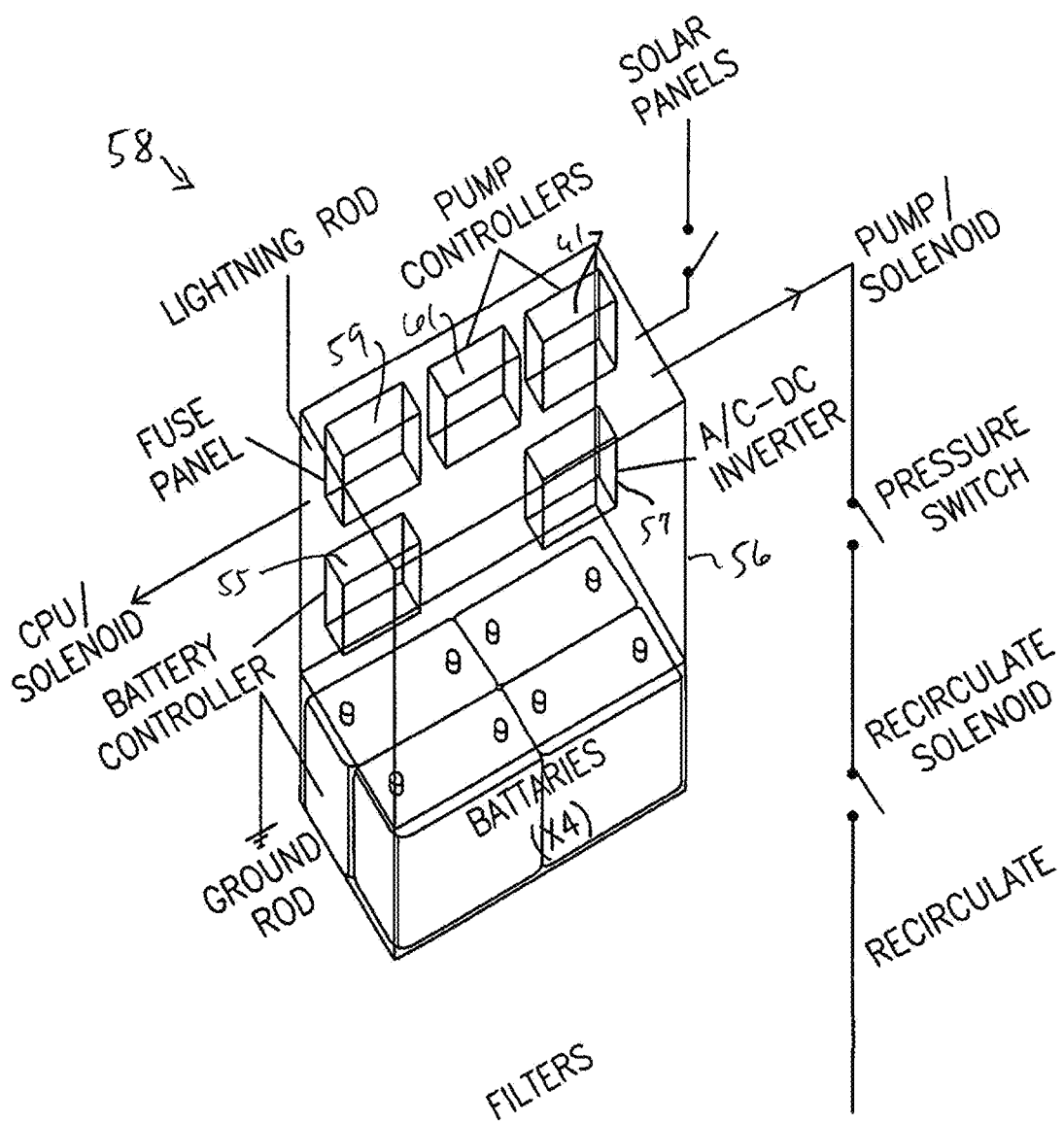
FIG. 14 is a perspective view of a component for use in a kiosk in accordance with the invention.

FIG. 14 is a perspective view of one aspect of a control system 58 which in one aspect includes a Faraday box aspect 56. In one aspect, control system 58 houses batteries 94, battery controller 55, AC-DC inverter 57, fuse panel 59, pump controllers 61 and/or device 300. System 58 includes a housing 56 which in one aspect is a faraday cage 56. System 58 is configured to communicate with CPU/solenoid and pump/solenoid 46. Lightning rod 25 and ground rod 27 are provided for electrical protection. Solar panels 26 are configured to provide electrical and recharging power to batteries 94. Alternating current electrical circuits associated with kiosk 20 in one aspect include a card reader (equipped at dispenser area), mother board (for operation of controllers and control system 58, and solenoid or valve such as dispenser valve 47. Direct current electrical circuits associated with kiosk 20 in one aspect include a connection to pump 32, solenoid/temp switch recycle 46, and inside and outside lights. Additional Faraday cages or boxes may be used throughout kiosk 20 to protect individual or various electrical components that may be otherwise subject to unwanted electricity or electromagnetic pulses. In operation, a pumping, geothermal heating/cooling, filtering, and dispensing of water (and return of water to the well) operations are performed using the systems shown in FIG. 13 and FIG. 14.

In some aspects, pump 33 is positioned at a bottom of well 30 for protection from electromechanical waves or pulses, or pump 33 is included within the Faraday cage. In this manner kiosk 20 is better equipped to provide purified water in an emergency or a disaster event. As can be appreciated, the non-retained water is passed back to the well in a closed loop to limit contamination.

Further aspects of the invention include a method of assembling 120 and a method of operation 220 of a solar powered water purification kiosk 20. In one aspect, the method 120 includes a step 122 of positioning a base 22 directly over a well 30 where the well 30 contains a pump 32, and 124 adding a canopy 24 having at least one solar panel 26 to the top of the base 22, the solar panel 26 configured to supply electricity to the kiosk 20 to operate the pump 32. In a further aspect the method of assembly 120 includes a step of 126 configuring at least one radiator 42 within the kiosk 20 to receive water pumped from the pump 30 in order to regulate temperature control within the kiosk. In a further aspect the method 120 includes the step of 128 configuring a dispenser to dispense the pumped water. In a further aspect the method 120 includes the step of 130 configuring the kiosk with a filter or filters 50, 60, 70, 80 to treat the water prior to dispensing. In a further aspect the method 120 includes the step of 132 configuring at least one radiator 42 to receive water pumped from within the kiosk 20 to regulate temperature control within the kiosk 20 and to circulate that water to a filter for subsequent dispensing of the filtered water. In a further aspect the method includes the step 134 of configuring a dispenser connected to the kiosk to dispense the water upon payment. A further aspect of the method 120 includes the step 136 of drilling or preparing the well.

In one aspect, a method of operation 220 of the invention includes 222 pumping water from a well positioned beneath a kiosk, 224 moving the pumped water to a radiator within the kiosk and then to a filter within the kiosk and then 226 dispensing the filtered water. In further aspects the method 220 includes 228 dispensing the filtered water upon payment. In further aspects the method 220 includes 230 moving the pumped water to radiators positioned at a perimeter of the kiosk. In further aspects the method 220 includes 232 pumping the water via an electric pump powered by rechargeable batteries receiving power from a solar panel associated with the kiosk.

Figure 18:
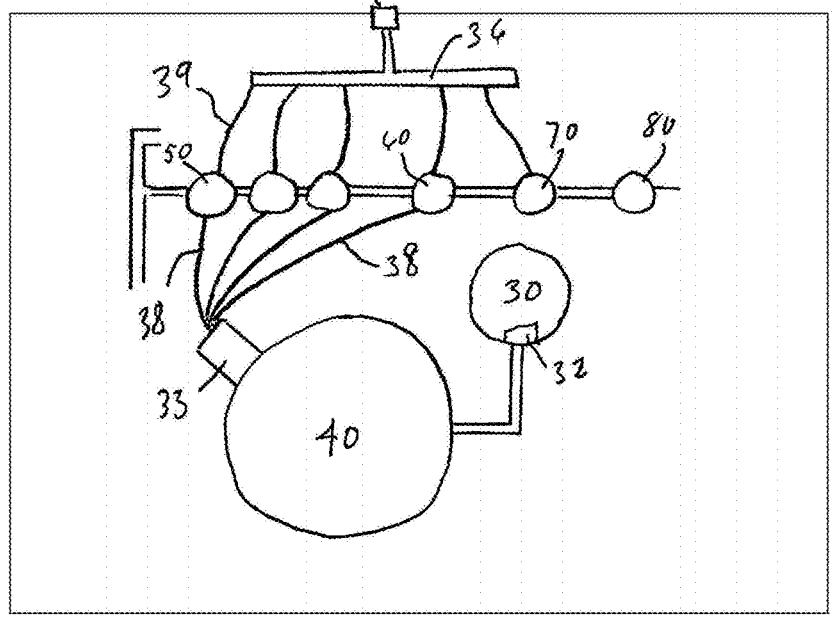
FIG. 18 is a plan view of an interior of a kiosk in accordance with a further aspect of the invention.

FIG. 18 is a plan view of an interior of a kiosk in accordance with a further aspect of the invention. A back flush operation is possible by sending water from the raw water holding tank 40 to the filters. A flush line 38 delivers water to a filter in reverse direction causing an exit of water in one aspect to an exit line 39. A series of flush lines 38 may be configured to individually flush each filter and a series of exit lines 39 configured to assemble to a manifold 36 for delivery of expressed water to the exterior of kiosk 20 via exit port 34. A pump 33 may be used to expel the back-flush water. Controller 49 in one aspect is configured to receive signal data from filters 50-80 to automatically activate a back-flush mode in order to back-flush one or several of the filters. The filters in one aspect include various sensors to monitor the health or status of the filters. The sensors are configured to supply data signals to controller 49. Each filter may be configured with a 3-way valve (or other multi-function valve) to accommodate normal operation and back-flush operation. Other supply and flush line configurations may be utilized as needed.

In a further aspect the invention includes assembling a set of four kiosks 20 within a single shipping container, along with canopies and all equipment for each kiosk. An installation aspect further includes placement of a precast concrete pad above a well head, bolting the base of the kiosk to the pad, then adding the canopy and solar panels. The concrete pads for each of the four kiosks in one instance are also supplied in the shipping container. Each kiosk is modular and in one example has a dimension of 95 inches by 79 inches by 90 inches such that insertion of four kiosks is accomplished within a standard shipping container.

It should be understood, of course, that the foregoing relates to exemplary embodiments of the invention and that modifications may be made without departing from the spirit and scope of the invention as set forth in the following claims.

What is claimed is:

1. A device comprising:
a base having walls defining an interior, the base positioned above a well having a pump;
a canopy positioned above the base and having at least one solar panel configured to generate electricity to be provided to the pump;
a radiator positioned within the interior and configured to receive water pumped from the pump;
a filter configured to receive water from the radiator; and
a dispenser configured to receive water from the filter.

2. The device of claim 1 where the walls are exterior walls of the base, the device further comprising a set of radiators positioned within the interior and adjacent the exterior walls of the base.

3. The device of claim 1 further comprising a set of radiators and a line configured to deliver water from at least one of the radiator back to the well.

4. The device of claim 1 further comprising a first retaining tank configured to receive water from the pump and to release the water to the radiator, and a second retaining tank configured to receive water from the filter and to release the water to the dispenser.

5. The device of claim 4 where the dispenser is configured to release the water upon payment by a user.

6. The device of claim 1 further comprising a controller configured to receive power from a rechargeable battery charged by the solar panel and to control operation of a valve for directing water flow from the radiator to return to the well and/or to supply to the filter.

7. The device of claim 6 where the controller is positioned within a faraday box.

8. The device of claim 1 further comprising a first retaining tank configured to receive water from the pump and to release the water to the radiator, and a second retaining tank configured to receive water from the filter and to release the water to and through the dispenser upon payment by a user, the dispenser having standard weights and measures controls.

9. The device of claim 8 where the radiator is stainless steel and the first retaining tank is configured for pressurized retention of water therein.

10. A method of manufacturing a water dispensing kiosk, the method comprising positioning the device of claim 1 above a well.

11. A method of dispensing water, comprising:
pumping water from a well located beneath a kiosk and to a holding tank within the kiosk;
passing the water from the holding tank to a radiator within the kiosk;
passing the water from the radiator to a filter within the kiosk to provide filtered water;
storing the filtered water in a storage tank; and
dispensing the filtered water from the storage tank via a dispenser to a position external the kiosk.

12. The method of claim 11 further comprising circulating the water from the radiator back to the well.

13. The method of claim 11 where the pumping of water from a well includes storing electrical power in a rechargeable battery and recharging the battery by utilizing a solar panel positioned atop the kiosk.

14. A water dispensing kiosk, comprising:
a base having walls defining an interior, the base configured to be positioned above a well configured to have a pump;
a canopy positionable above the base and configured to have at least one solar panel configured to generate electricity to be provided to a pump;
a radiator positioned within the interior and configured to receive water pumped from a pump;
a filter configured to receive water from the radiator; and
a dispenser configured to receive water from the filter.

15. The kiosk of claim 14 further comprising a well, the base positioned above the well.

16. The kiosk of claim 14 where a least one of the walls comprises an insulated aluminum panel.

17. The kiosk of claim 14 where the filter is a set of filters comprising a sediment removal filter, a heavy metal removal filter, a carbon filter, a micro filtration filter, an ultra filtration filter and a UV treatment filter.

18. The kiosk of claim 14 further comprising a solar panel where the solar panel is configured to power a rechargeable battery, the rechargeable battery configured to power a pump and the dispenser.

19. The kiosk of claim 14 where the radiator includes a set of radiators configured in series at an interior perimeter of the kiosk, a line connecting a terminal radiator to the filter and a line configured to connect the terminal radiator to a well, a valve controlled by a controller and configured to open and close to allow water to flow to a well and alternatively to the filter.

20. The kiosk of claim 19 further comprising a controller configured to automatically control the valve and the pump based on signal data from a thermostat.

21. The kiosk of claim 14 further comprising a pump, the radiator configured to receive water from the pump.

* * * * *